US012776464B1

(12) United States Patent
Samakar et al.

(10) Patent No.: US 12,776,464 B1
(45) Date of Patent: Oct. 27, 2026

(54) REMOTELY CONTROLLABLE CIRCUIT BREAKER DEVICE WITH SINGLE PAIR OF CONTACTS

(71) Applicant: AMAZON TECHNOLOGIES, INC., Seattle, WA (US)

(72) Inventors: Amirhossein Samakar, Fremont, CA (US); Jiger Patel, San Jose, CA (US); Mark Armin Patel, Seattle, WA (US); Christopher Buonomo, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 18/483,702

(22) Filed: Oct. 10, 2023

(51) Int. Cl.
*H01H 50/18* (2006.01)
*H01H 50/44* (2006.01)
*H01H 50/64* (2006.01)

(52) U.S. Cl.
CPC ............ *H01H 50/18* (2013.01); *H01H 50/44* (2013.01); *H01H 50/64* (2013.01)

(58) Field of Classification Search
CPC ......... H01H 50/18; H01H 50/44; H01H 50/64
USPC .......................................................... 335/185
See application file for complete search history.

(56) References Cited

U.S. PATENT DOCUMENTS 4,675,641 A * 6/1987 Hampton ........... H01H 71/7409 335/39
4,725,799 A * 2/1988 Bratkowski ............ H01H 89/08 335/14
RE32,882 E * 3/1989 Yokoyama ............. H01H 89/08 335/14
4,879,535 A * 11/1989 Mori ...................... H01H 89/08 335/14
4,982,174 A * 1/1991 Fasano ................... H01H 73/18 218/151
5,576,677 A * 11/1996 Malingowski ....... H01H 71/128 335/35
8,030,799 B1 * 10/2011 Flegel .................... H01H 89/06 307/64
9,502,200 B1 * 11/2016 Fleege ................. H01H 71/405
2014/0062623 A1 * 3/2014 Fasano ................... H01H 71/24 335/15
2020/0090891 A1 * 3/2020 Watford ............ H01H 71/2463

* cited by examiner

*Primary Examiner* — Shawki S Ismail
*Assistant Examiner* — Lisa N Homza
(74) *Attorney, Agent, or Firm* — Athorus, PLLC

(57) ABSTRACT

A circuit breaker device is used to control flow of electrical power from a first terminal connected to a power source to a second terminal connected to a load. A first electromagnet in the device is used to activate a trip mechanism and open a switch to disconnect the first terminal from the second, such as in response to a fault. The fault may be detected using dedicated circuitry or using one or more sensors. Once tripped, a manual reset is required. A second electromagnet is used to open the switch a smaller distance, without activating the trip mechanism, and to subsequently close the switch, in response to control commands. A latching mechanism may be used to retain the second electromagnet in a position that causes the switch to remain open until a subsequent command is received.

20 Claims, 10 Drawing Sheets

REMOTELY CONTROLLABLE CIRCUIT BREAKER DEVICE WITH SINGLE PAIR OF CONTACTS

BACKGROUND

Electrical faults, high electrical loads during a time of constrained supply, or other suboptimal conditions related to the provision of electrical power may cause damage to property or people, excessive use of resources, strain on infrastructure, and so forth. Some types of devices, such as circuit breakers, may be used to prevent the flow of electrical power under dangerous or undesired conditions.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
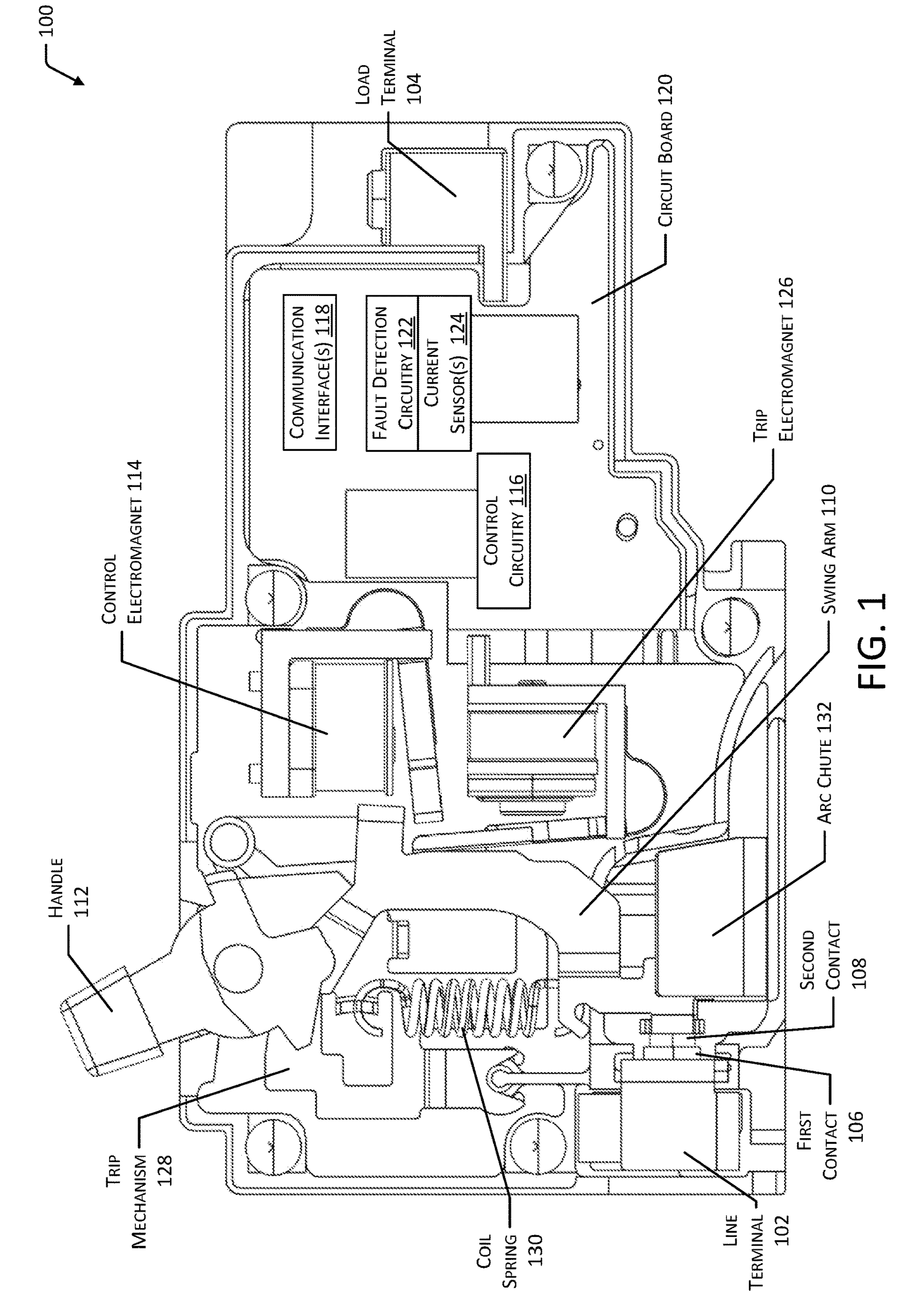
FIG. 1 is a diagram depicting an implementation of a circuit breaker device having two electromagnets that each control the position of a main contact switch within the device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Electrical power, such as alternating current, is distributed from a source, via electrical mains, into distribution panels (e.g., circuits), which may be found in homes, businesses, or other structures, facilities, or devices that use electrical power. Branch circuits connected to a distribution panel may conduct electrical power to loads. For example, one or more electrical outlets may be connected to a branch circuit, and one or more electrical devices, such as an appliance, may connect to an electrical outlet to receive the electrical power. A branch circuit may be connected to the distribution panel via a circuit breaker. Circuit breakers, or other current-limiting or protective devices, may electrically disconnect a branch circuit from a distribution panel under potentially dangerous conditions or other suboptimal conditions, such as if the transfer of electrical current to a branch circuit exceeds a threshold amount. Other electrical faults that may cause a circuit breaker to disconnect a circuit include a short circuit, a ground fault, an arc fault, and so forth.

In some cases, a circuit breaker may react slowly in response to the transfer of a large amount of current, or other electrical faults. Additionally, accurate detection of faults is limited to a particular device's ability to correctly detect a threshold circumstance to automatically disconnect a circuit. Manually disconnecting a circuit breaker typically requires the presence of a human operator to physically manipulate one or more components. While some types of circuit breakers are able to be operated remotely, these circuit breakers typically require additional components, such as separate switches for remotely disconnecting a circuit and for automatically placing the circuit breaker into a "tripped" (disconnected) state in response to a fault or other undesired electrical condition. The presence of additional components may increase the size of a device, add additional points of possible failure or inaccuracy, and increase the time and cost associated with construction and maintenance of the device. Additionally, use of multiple switches and other additional components may generate heat, which may interfere with the ability of various types of components to accurately detect faults, overcurrent, or short circuit events, cause inefficient transmission of electrical power across the circuit breaker, and so forth.

Described in this disclosure is an electrical circuit breaker device having a single main contact switch that may be controlled using two different actuators, such as electromagnets. A first electromagnet may be operated to cause the circuit breaker device to automatically enter a tripped state upon detection of a fault, high current, or other threshold condition. In some implementations, the circuit breaker may include a current transducer, or one or more other types of sensors, that may determine characteristics of current transmitted across the circuit breaker, and control circuitry may automatically operate the first electromagnet to open the main contact switch in response to a threshold characteristic of the current. Additionally, in some implementations, the first electromagnet may include components that cause the first electromagnet to automatically actuate in response to certain characteristics of the electrical current or certain types of events, such as an overcurrent or short circuit event. A second electromagnet may be operated to cause the circuit breaker device to open the main contact switch in response to a command received via a communication interface, without placing the circuit breaker into a tripped state. In some implementations, the second electromagnet may include a latching mechanism, such as a permanent magnet, that retains the circuit breaker in the open state after operation of the second electromagnet has ceased. In response to a second command to close the main contact switch, the second electromagnet may be operated in the opposite direction to close the main contact switch.

The circuit breaker device includes a line terminal that connects to a power source, a main contact switch, and a load terminal that connects to a load, that are connected in series. The main contact switch includes a first contact connected to the line terminal and a second contact connected to the load terminal. A trip mechanism may connect the second contact to the first electromagnet and the second electromagnet. The trip mechanism may include a first mechanical linkage, such as a biased swing arm, that is connected to the second contact, and that is also in contact with an armature of the second electromagnet. A second mechanical linkage may be connected to the first mechanical linkage and may contact an armature of the first electromagnet. In some implementations, use of separate mechanical linkages enables the second electromagnet to open and close the main contact switch via the first mechanical linkage without affecting the functionality of the first electromagnet and the second mechanical linkage. For example, opening the main contact switch using the second electromagnet would not place the circuit breaker device in a tripped state, and when the main contact switch is closed, the circuit breaker device may retain the functionality to enter a tripped state if a trip condition is detected.

When the first electromagnet is actuated, such as in response to a threshold electrical condition, the armature of the first electromagnet may move closer to the electrical coil of the first electromagnet. Movement of the armature may remove the armature from contact with the second mechanical linkage, enabling a biasing member to move the second mechanical linkage, which in turn moves the first mechanical linkage and separates the second contact from the first contact, placing the circuit breaker in a tripped state. Because the second mechanical linkage is moved using a biasing member, continued actuation of the first electromagnet is not necessary to retain the circuit breaker device in a tripped state. After the second mechanical linkage has moved, actuation of the first electromagnet may be ceased, enabling a short, pulsed actuation to be used to place the circuit breaker device into the tripped state using a small amount of power. The main contact switch may be returned to a closed position by manually resetting the circuit breaker, such as through manipulation of a handle to return the mechanical linkages to their original positions.

When the second electromagnet is actuated using a remote command, the armature of the second electromagnet may move closer to the electrical coil of the second electromagnet and apply a force to the first mechanical linkage. The first mechanical linkage may move under application of this force, causing the second contact connected to the first mechanical linkage to be separated from the first contact. This movement may open the main contact switch without moving the second mechanical linkage or placing the circuit breaker in a tripped state. The latching mechanism of the second electromagnet may maintain the armature in a position proximate to the electrical coil until a second remote command is received to cause operation of the second electromagnet and movement of the armature in the opposite direction. Therefore, continued actuation of the second electromagnet is not necessary to retain the circuit breaker device in the open state, enabling a short, pulsed actuation to be used to place the circuit breaker device into the open state using a small amount of power. Movement of the armature in the opposite direction may remove the armature from contact with the first mechanical linkage, enabling a biasing member to move the second contact toward the first contact and return the main contact switch to the closed position.

Implementations described herein may include a compact design with a single switch. Use of a current transducer to determine characteristics of current, and an electromagnet that may be automatically actuated if current greater than a threshold is transmitted through the electromagnet, may enable accurate detection of electrical faults without relying on larger bimetallic components, which may be adversely affected by ambient temperature. Implementations described herein may therefore operate across a large range of ambient temperatures without incurring power loss associated with use of large bimetallic components or similar elements. Use of a second electromagnet to enable remote disconnection and reconnection of a circuit may enable remote disconnection of a load at times when an undetected electrical condition is suspected or a suboptimal electrical condition is expected to occur, and may enable disconnection of a load in response to circumstances other than electrical faults. Remote disconnection of a load that does not place the circuit breaker into a tripped state may also enable reconnection of the load without requiring manual physical steps to be performed by a human operator.

FIG. 1 is a diagram 100 depicting an implementation of a circuit breaker device having two electromagnets that each control the position of a main contact switch within the device. The device may include a line terminal 102 that receives electrical power from a power source. The device may also include a load terminal 104, which may connect to a load to enable electrical power to flow from the line terminal 102, through the circuit breaker device, to the load terminal 104, to energize the load. The circuit breaker device includes a main contact switch connected in series between the line terminal 102 and the load terminal 104. The main contact switch includes a first contact 106 connected to the line terminal 102, and a second contact 108 connected to the load terminal 104. When the main contact switch is in a closed position, as depicted in FIG. 1, the first contact 106 and the second contact 108 are in contact with one another and electrical power is able to flow from the line terminal 102 to the load terminal 104. To prevent the flow of electrical power and electrically disconnect the load terminal 104 from the line terminal 102, the main contact switch may be opened by moving the second contact 108 away from the first contact 106.

For example, the second contact 108 of the main contact switch may be connected to a swing arm 110, which may be movable to separate the second contact 108 from the first contact 106 and open the main contact switch. In some implementations, a handle 112 or other type of manual control may be used to apply a force to the swing arm 110 to move the second contact 108 away from the first contact 106 to open the main contact switch. When the main contact switch is open, the handle 112 may be used to apply a force to the swing arm 110 in the opposing direction to move the second contact 108 toward the first contact 106 to close the main contact switch.

The swing arm 110 may also be moved using force applied by a control electromagnet 114. For example, the control electromagnet 114 may include an electrical coil and an armature, and application of a current to the electrical coil to energize the control electromagnet 114 may move the armature to a position proximate to the electrical coil. Continuing the example, when the control electromagnet 114 is actuated, the armature thereof may move into contact with a portion of the swing arm 110 and apply a force to the swing arm 110, which may move the swing arm 110 to separate the second contact 108 from the first contact 106. In some implementations, the control electromagnet 114 may include a latching mechanism, such as a magnet or a mechanical feature that retains the armature in the position proximate to the electrical coil in the absence of the application of current to the electrical coil. When current is applied to the electrical coil to move the armature in the opposite direction away from the electrical coil, movement of the armature may release the armature from the latching mechanism and the swing arm 110 may return to a position in which the second contact 108 is in contact with the first contact 106. The control electromagnet 114 may be operated using control circuitry 116, which may energize the control electromagnet 114 in response to commands received using one or more communication interfaces 118. For example, a communication interface 118 may include a Wi-Fi, Bluetooth, IEEE 1901 standard, X10, powerline communication, communication interface with associated hardware such as one or more associated antennas, signal couplers, and so forth. Continuing the example, the circuit breaker device may include a circuit board 120, which may include various components for controlling the device, detecting faults or other characteristics of electrical power, and so forth. The communication interfaces 118 and control circuitry 116 may be connected to the circuit board 120, and to other components of the circuit breaker device via conductors in the circuit board 120. In response to a first command to open the main contact switch, which may be provided to the circuit breaker device using the communication interface(s) 118, the control circuitry 116 may operate the control electromagnet 114 to move the armature proximate to the electrical coil and apply a force to the swing arm 110 to move the second contact 108 away from the first contact 106. In response to a second command to close the main contact switch, the control circuitry 116 may operate the control electromagnet 114 to move the armature away from the swing arm 110 to enable the swing arm 110 to return to a position in which the second contact 108 contacts the first contact 106.

The circuit board 120 may also include fault detection circuitry 122, which may determine characteristics of electrical power within the circuit breaker device, such as characteristics indicative of a short circuit, an overcurrent fault, a ground fault, an arc fault, or other types of faults. The circuit board 120 may include one or more current sensors 124, which may determine characteristics associated with current in the device, such as overcurrent (e.g., current in excess of a threshold value), short circuits, current flowing through incorrect paths or locations, and so forth. In some implementations, a current sensor 124 may include a current transducer. The fault detection circuitry 122 and the current sensor(s) 124 may generate a signal indicative of determined characteristics of electrical power in the device, and the control circuitry 116 may operate a trip electromagnet 126 in response to the signal(s).

The trip electromagnet 126 may include an electrical coil and an armature that contacts a trip mechanism 128. The trip mechanism 128 may include one or more mechanical linkages that are connected to the second contact 108 via the swing arm 110. For example, FIG. 1 depicts the trip mechanism 128 connected to the swing arm 110 via a coil spring 130 having a first end connected to the swing arm 110 and a second end connected to the trip mechanism 128. In some implementations, one or more other portions of the trip mechanism 128 may be connected to the swing arm 110, or one or more portions of the trip mechanism 128 may be positioned relative to the swing arm 110 such that movement of the trip mechanism 128 applies a force to the swing arm 110 to move the second contact 108 away from the first contact 106. The control circuitry 116 may operate the trip electromagnet 126 to move the armature toward the electrical coil thereof. In other implementations, the trip electromagnet 126 may include a current sensing component, and in response to current through the trip electromagnet 126 exceeding a threshold value, the trip electromagnet 126 may be actuated to move the armature independent of the current sensor(s) 124, fault detection circuitry 122, or control circuitry 116. Movement of the armature away from the trip mechanism 128 may enable force from the coil spring 130 or other forces to move the trip mechanism 128, which may in turn cause the swing arm 110 to move and separate the second contact 108 from the first contact 106. The trip mechanism 128, swing arm 110, and second contact 108 may be returned to the previous position by applying a force to the swing arm 110 and attached trip mechanism 128 using the handle 112. In other implementations, the trip electromagnet 126 may cause movement of one or more of the trip mechanism 128, swing arm 110, or second contact 108 by applying a force via movement of the armature.

The circuit breaker device may include an arc chute 132 positioned proximate to the first contact 106 and the second contact 108. The arc chute 132 may function to divide, cool, and extinguish electrical arcs associated with the contacts. The arc chute 132 may be placed such that electrical arcs are extinguished independent of whether the second contact 108 is in the closed position shown in FIG. 1, an open position associated with the control electromagnet 114, or a tripped position associated with actuation of the trip mechanism 128.

While FIG. 1 depicts a single trip mechanism 128, swing arm 110, and contact switch, in other implementations, the circuit breaker device may include a double-pole or multiple-pole circuit breaker device. For example, trip mechanisms 128 or other portions of the circuit breaker device may be engaged with corresponding trip mechanisms of other devices using a tie bar or other type of mechanical connector, such that when a single circuit breaker device is placed in a tripped state, other engaged devices are also placed in a tripped state. Use of mechanically-engaged circuit breaker devices may enable a single trip electromagnet 126, fault detection circuitry 122, or current sensor(s) 124 to be used to place multiple circuit breaker devices into a tripped state. In other implementations, multiple circuit breaker devices may include individual trip electromagnets 126, fault detection circuitry 122, or current sensor(s) 124, and may be configured to be placed into a tripped state in response to a signal from another device that enters a tripped state. In some implementations, in a similar manner, multiple circuit breaker devices may be placed into open and closed states using a single control electromagnet 114, or multiple control electromagnets 114 that are actuated in response to a device entering a closed or open state.

Figure 2:
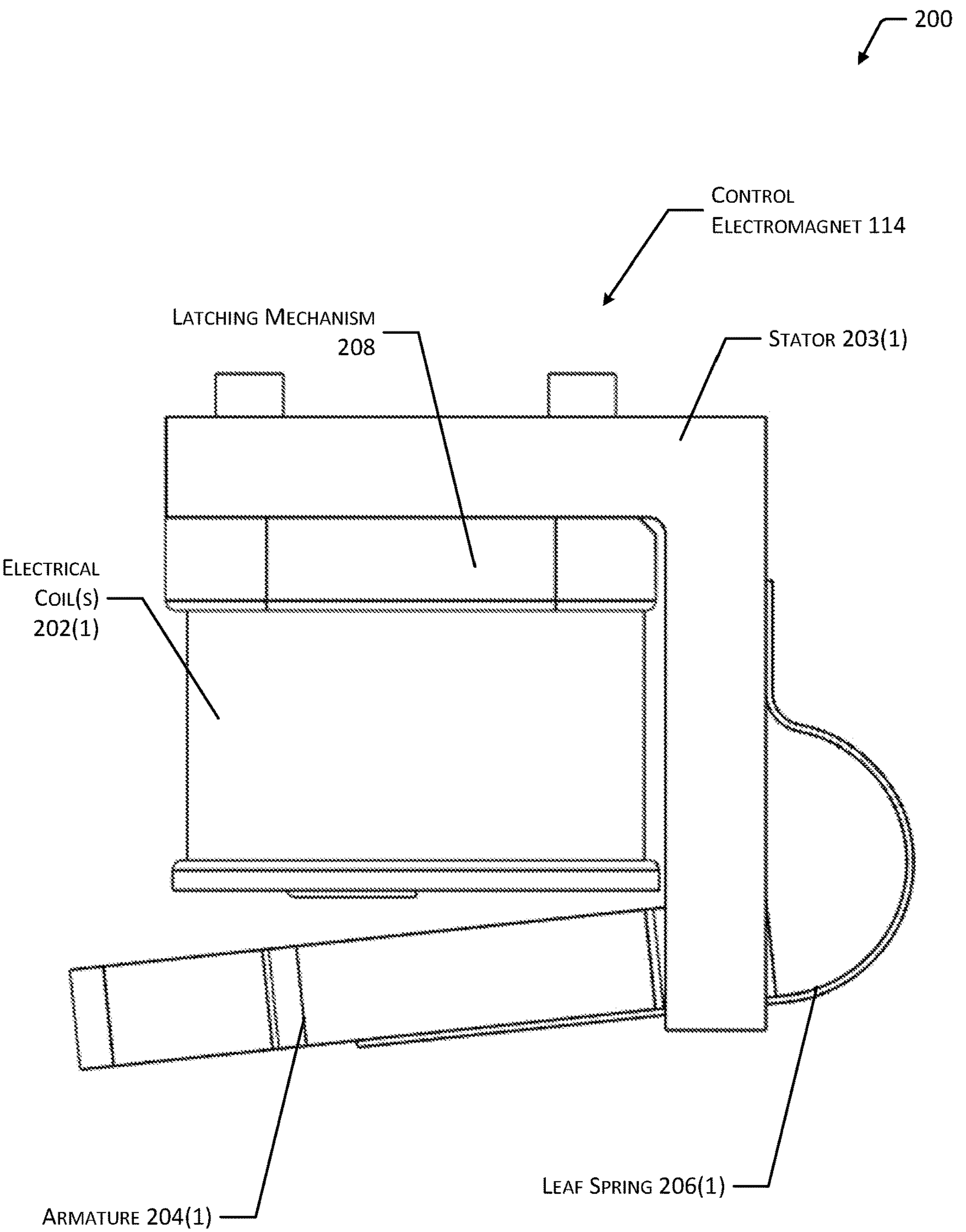
FIG. 2 is a diagram depicting an implementation of the control electromagnet of the circuit breaker device of FIG. 1.

FIG. 2 is a diagram 200 depicting an implementation of the control electromagnet 114 of the circuit breaker device of FIG. 1. As described with regard to FIG. 1, the control electromagnet 114 may include one or more electrical coils 202(1) wound around a bobbin and an electromagnet core, such as a cylindrical structure formed from low carbon steel or another ferromagnetic material. The electrical coils 202(1) and core may be secured to a stator 203(1). An armature 204(1) formed from a ferrous material may extend from the stator 203(1) and may be positioned at one end of the electrical coil(s) 202(1). When the control electromagnet 114 is not actuated, a leaf spring 206(1) or other type of biasing mechanism may maintain the armature 204(1) in a position that is spaced from the electrical coil(s) 202(1). When the control electromagnet 114 is actuated, magnetic force may move the armature 204(1) to a position proximate to the electrical coil(s) 202(1). As described with regard to FIG. 1, movement of the armature 204(1) to a position proximate to the electrical coil(s) 202(1) may apply a force to the swing arm 110 of the circuit breaker device to open the main contact switch.

In some implementations, the control electromagnet 114 may include a latching mechanism 208. For example, the latching mechanism 208 may include a magnet, or in some cases, another type of mechanical engagement member. The latching mechanism 208 may retain the armature 204(1) in the position proximate to the electrical coil(s) 202(1) after actuation of the control electromagnet 114 has ceased. Use of the latching mechanism 208 may enable the armature 204(1) to retain the swing arm 110 in a position that separates the second contact 108 from the first contact 106 in the absence of the application of current to the control electromagnet 114. In some implementations, the control electromagnet 114 may include multiple electrical coils 202(1), and may be operated in two directions. For example, to release the armature 204(1) from the latching mechanism 208 and enable the main contact switch to close, the control electromagnet 114 may be actuated to apply a magnetic force to the armature 204(1) to move the armature 204(1) away from the latching mechanism 208.

Because the control electromagnet 114 is positioned to contact the swing arm 110 but is not directly connected to the trip mechanism 128, operation of the control electromagnet 114 to move the swing arm 110 using the armature 204(1) may enable the main contact switch to be opened and closed without placing the circuit breaker device in a tripped state or affecting the functionality of the circuit breaker device to enter the tripped state after the switch is closed. Use of the control electromagnet 114 may enable loads to be disconnected from a power source for reasons other than electrical faults or characteristics of the electrical current or power, and may enable loads to be preemptively disconnected in advance of conditions that may cause damage to components. In some implementations, the control circuitry 116 may be configured to actuate the control electromagnet 114 automatically in response to one or more threshold conditions, such as disconnecting one or more loads at times when a power source or other infrastructure is experiencing high loads or other suboptimal conditions.

Figure 3:
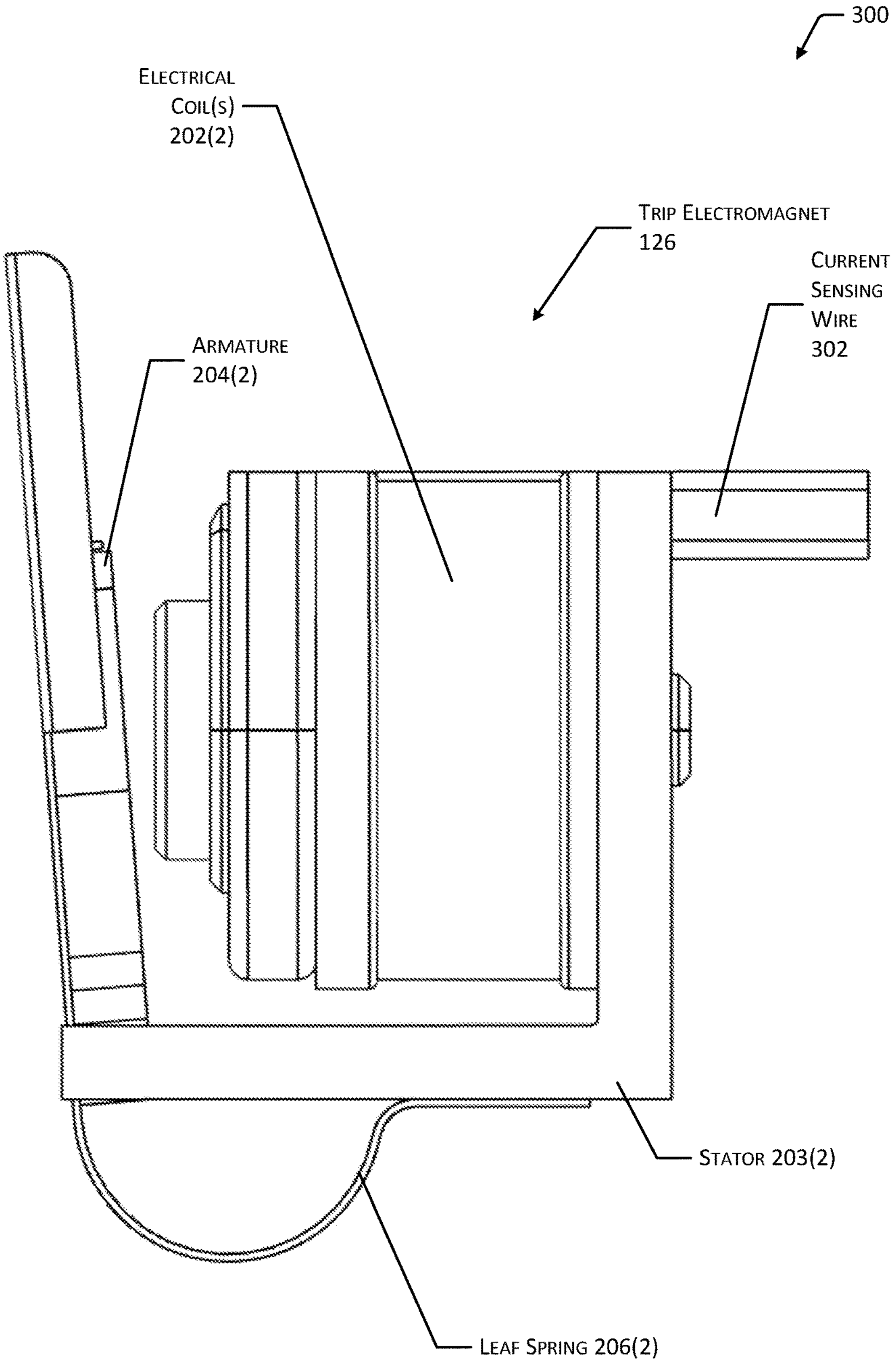
FIG. 3 is a diagram depicting an implementation of the trip electromagnet of the circuit breaker device of FIG. 1.

FIG. 3 is a diagram 300 depicting an implementation of the trip electromagnet 126 of the circuit breaker device of FIG. 1. As described with regard to FIG. 1, the trip electromagnet 126 may be operated in response to characteristics of electrical power in the circuit breaker device, such as faults, short circuits, overcurrent, voltage or frequency above or below a threshold, and so forth. The trip electromagnet 126 may include one or more electrical coils 202(2) wrapped around an electromagnet core and bobbin that are secured to a stator 203(2) from which an armature 204(2), formed from a ferrous material, extends. When current is applied to the electrical coil(s) 202(2), magnetic force may move the armature 204(2) relative to the electrical coil(s) 202(2). For example, as described with regard to FIG. 1, the armature 204(2) may contact a trip mechanism 128 of the circuit breaker device. This contact may prevent movement of the trip mechanism 128. When the armature 204(2) is moved to a position proximate to the electrical coil(s) 202(2), the trip mechanism 128 may be permitted to move in a manner that moves the swing arm 110 and separates the second contact 108 from the first contact 106. In the absence of the application of current to the electrical coil(s) 202(2), a leaf spring 206(2) or other type of biasing member may maintain the armature 204(2) in a position that is spaced from the electrical coil(s) 202(2).

In some implementations, the trip electromagnet 126 may include a current sensing wire 302 that may conduct electrical current from the circuit breaker device across the trip electromagnet 126. When current through the trip electromagnet 126 exceeds a threshold value, the trip electromagnet 126 may be configured to be automatically actuated to move the armature 204(2) toward the electrical coil(s) 202(2) to open the main contact switch and place the circuit breaker device in a tripped state. In some implementations, the trip electromagnet 126 may be operated using the control circuitry 116. For example, in response to signals from the fault detection circuitry 122 or current sensor(s) 124 indicative of a fault or a selected characteristic of electrical power, the control circuitry 116 may operate the trip electromagnet 126 to move the armature 204(2) and enable the trip mechanism 128 to move and open the main contact switch.

Figure 4A:
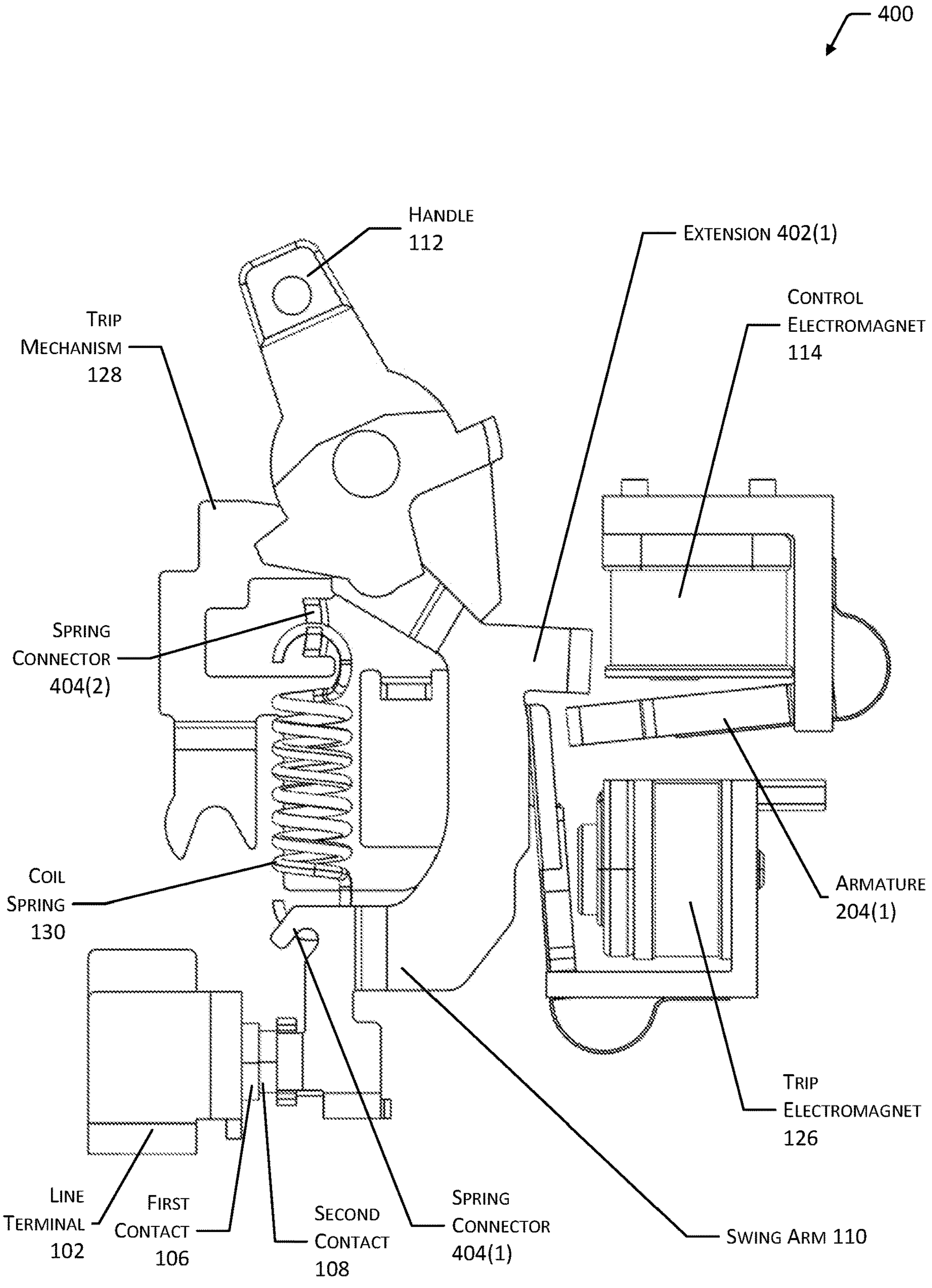
FIGS. 4A, 4B, and 4C are diagrams depicting an implementation of mechanical linkages between the main contact switch and the electromagnets of the circuit breaker device of FIG. 1.
Figure 4B:
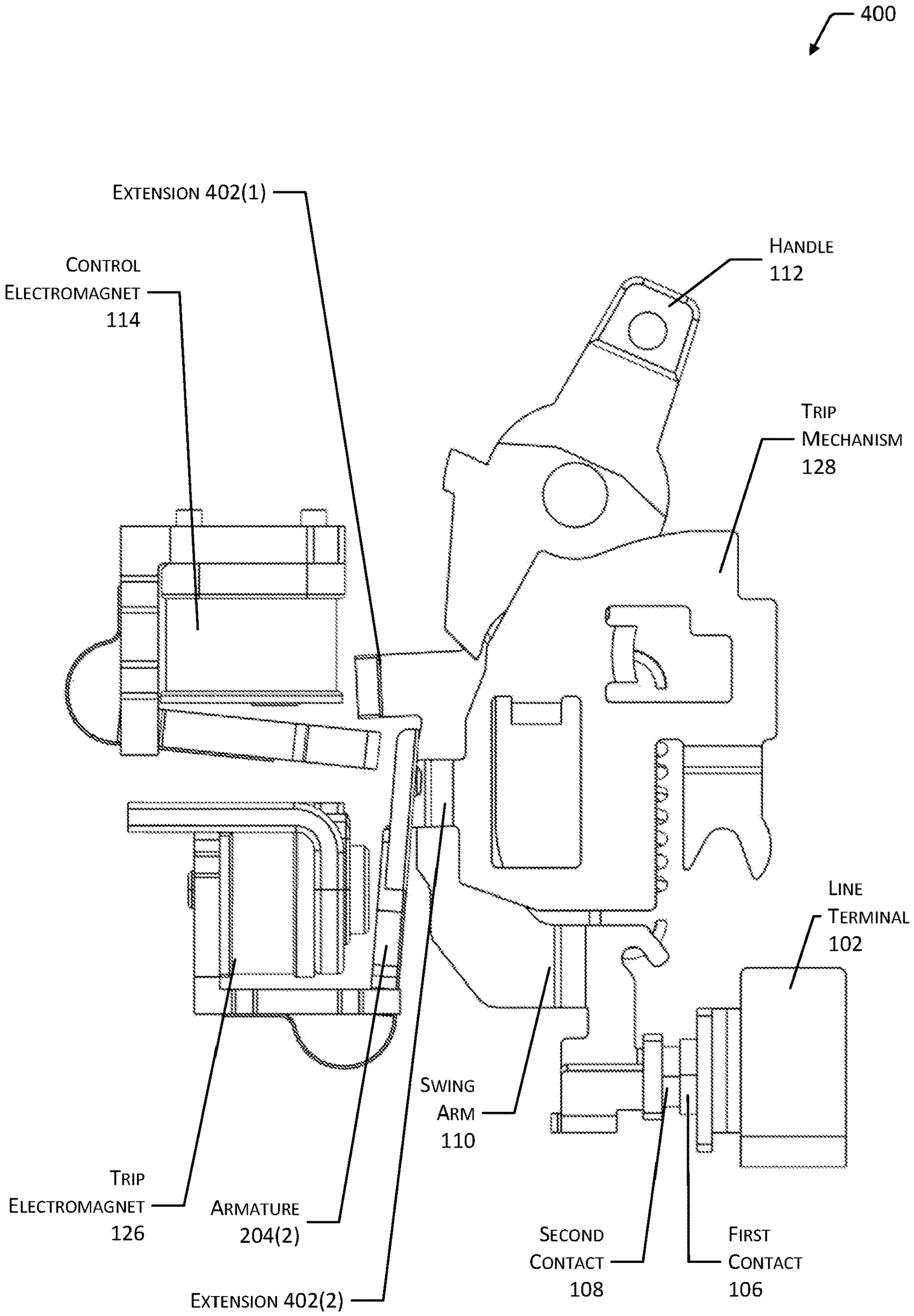
Figure 4C:
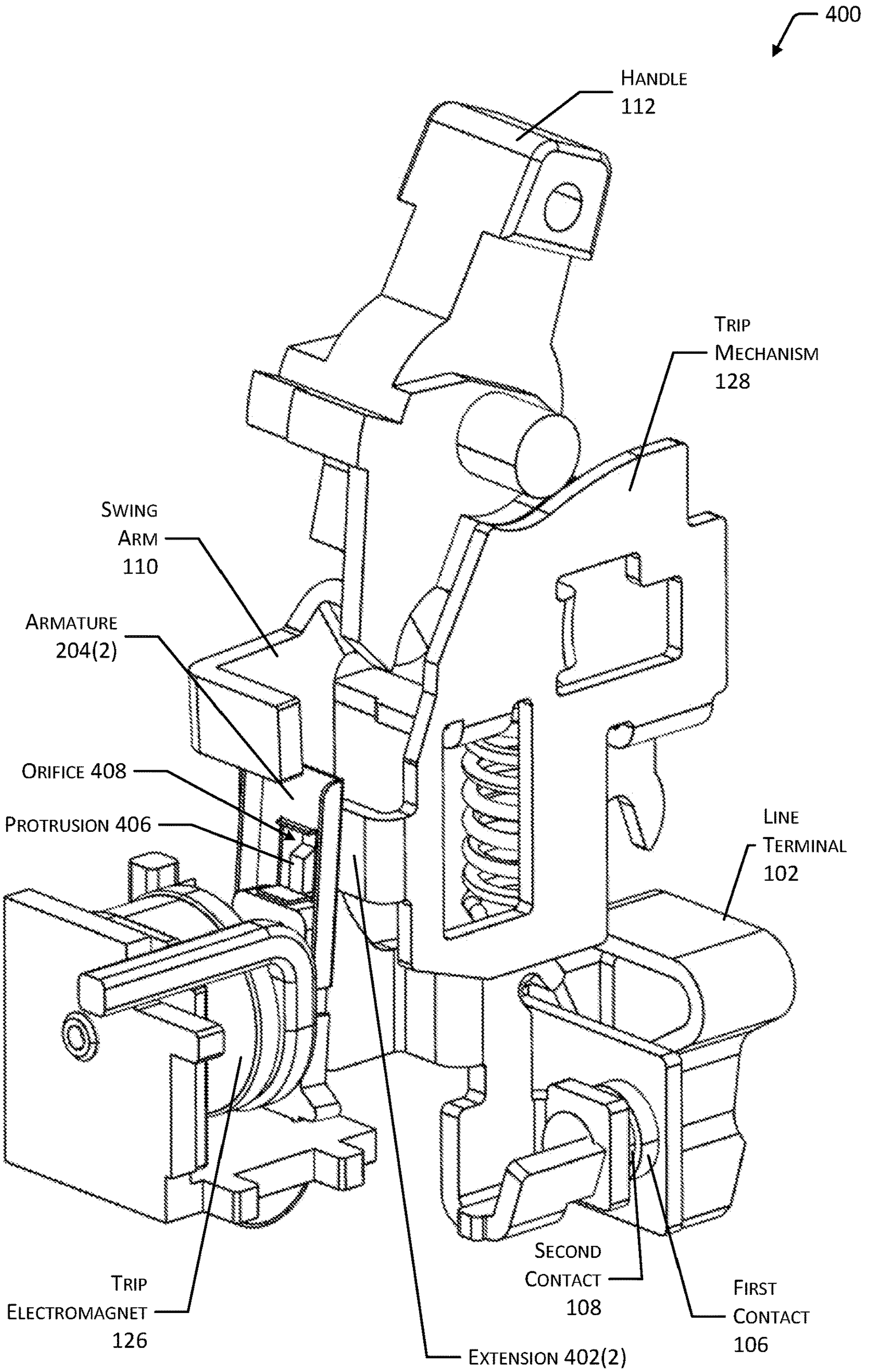

FIGS. 4A-4C are diagrams 400 depicting an implementation of mechanical linkages between the main contact switch and the electromagnets of the circuit breaker device of FIG. 1. As described with regard to FIG. 1, the second contact 108 of the main contact switch may be connected to a swing arm 110. Movement of the swing arm 110 may move the second contact 108 away from the first contact 106 to open the main contact switch. The swing arm 110 may be moved using a force applied to the handle 112, or as described with regard to FIGS. 1 and 2, a force applied to the swing arm 110 using the armature 204(1) of the control electromagnet 114.

For example, as shown in FIG. 4A, the swing arm 110 may include an extension 402(1) that is positioned proximate to the armature 204(1) of the control electromagnet 114. The position of the armature 204(1) relative to the extension 402(1) of the swing arm 110 may be such that when the control electromagnet 114 is actuated, the armature 204(1) may be moved into contact with the extension 402(1), but when the control electromagnet 114 has not been actuated, the armature 204(1) may be spaced from the extension 402(1). As described with regard to FIGS. 1 and 2, when the control electromagnet 114 is operated to move the armature 204(1) to a position proximate to the electrical coil(s) 202(1) of the control electromagnet 114, the armature 204(1) may apply a force to the extension 402(1) of the swing arm 110, moving the swing arm 110 such that the second contact 108 is moved away from the first contact 106 to open the main contact switch. In some implementations, the control electromagnet 114 may include a latching mechanism 208 to retain the armature 204(1) in a position proximate to the electrical coil(s) 202(1) and retain the swing arm 110 in a position that separates the second contact 108 from the first contact 106 in the absence of application of current to the control electromagnet 114. Because the control electromagnet 114 does not contact or move the trip mechanism 128 and because the moment of the swing arm 110 caused by the armature 204(1) may be a generally short distance, the circuit breaker device is not placed into a tripped state due to actuation of the control electromagnet 114. A second current may be applied to the control electromagnet 114 to cause the armature 204(1) to move away from the electrical coil(s) 202(1), releasing the armature 204(1) from the latching mechanism 208 and enabling the swing arm 110 to return to a position in which the second contact 108 contacts the first contact 106.

As shown in FIG. 4A, the swing arm 110 may be connected to the trip mechanism 128. In the implementation shown in FIGS. 1 and 4, a coil spring 130 has a first end connected to a first spring connector 404(1) of the swing arm 110 and a second spring connector 404(2) of the trip mechanism 128. The spring connectors 404 may include hooks, protrusions, orifices, grooves, recessions, or other mechanical engagement mechanisms that may retain the coil spring 130 in a connected relationship with the swing arm 110 and trip mechanism 128. In other implementations, the coil spring 130 may be integrally connected with one or both of the swing arm 110 or trip mechanism 128. In still other implementations, one or both of the swing arm 110 or trip mechanism 128 may be connected using other links, protrusions, or methods of engagement. In some cases, the trip mechanism 128 may include one or more extensions 402 or protrusions that may be positioned to contact the swing arm 110 and apply a force thereto when the trip mechanism 128 moves. For example, when the circuit breaker device is tripped, a portion of the trip mechanism 128 may contact and cause movement of the swing arm 110 to cause the second contact 108 to be separated from the first contact 106.

As shown in FIG. 4B, the armature 204(2) of the trip electromagnet 126 may contact an extension 402(2) of the trip mechanism 128. For example, the extension 402(2) of the trip mechanism 128 may protrude into an orifice, recess, or groove in the armature 204(2) of the trip electromagnet 126, or a protruding portion of the armature 204(2) may extend into an orifice, recess, or groove in the extension 402(2) of the trip mechanism 128. As shown in FIG. 4C, the extension 402(2) may include a protrusion 406 that extends into an orifice 408 of the armature 204(2) of the trip electromagnet 126. Contact between the walls of the orifice 408 of the armature 204(2) and the protrusion 406 of the trip mechanism 128 may retain the trip mechanism 128 in a position in which the second contact 108 contacts the first contact 106. As described with regard to FIGS. 1 and 3, when the trip electromagnet 126 is actuated, the armature 204(2) may move to a position proximate to the electrical coil(s) 202(2) of the trip electromagnet 126, which may disengage the armature 204(2) from the extension 402(2) and enable a force from the coil spring 130 or another force to cause the trip mechanism 128 to move. Movement of the trip mechanism 128 may cause movement of the attached swing arm 110, which may cause the second contact 108 to move away from the first contact 106. After the trip mechanism 128 has moved relative to the trip electromagnet 126, reengagement between the armature 204(2) and the extension 402(2) may occur when a manual force is applied to the handle 112 to return the trip mechanism 128 to the position depicted in FIG. 4B.

Figure 5A:
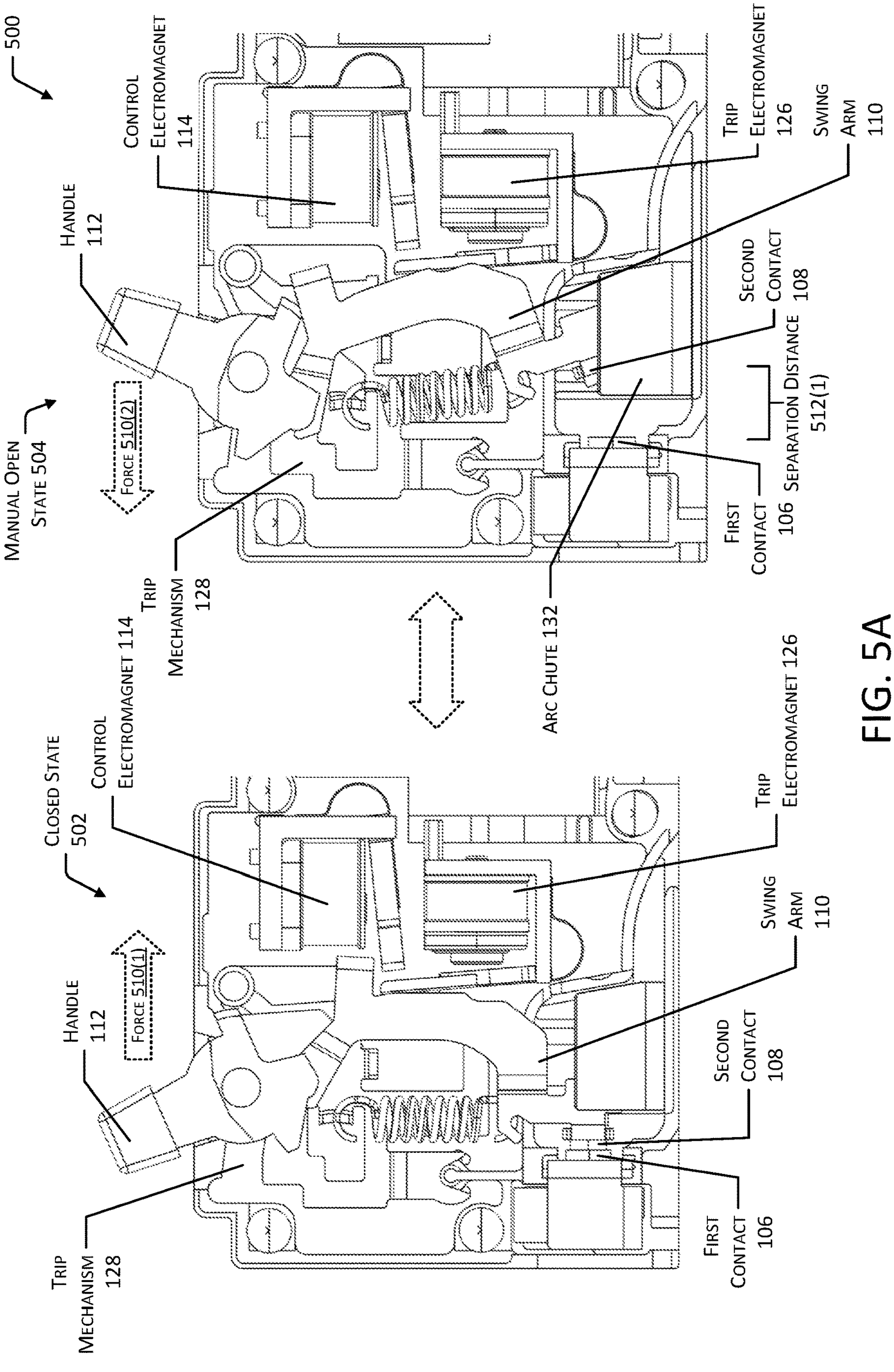
FIGS. 5A, 5B, and 5C are diagrams depicting implementations of the circuit breaker device of FIG. 1 in a closed state, a manual open state, a remote open state, and a tripped state.
Figure 5B:
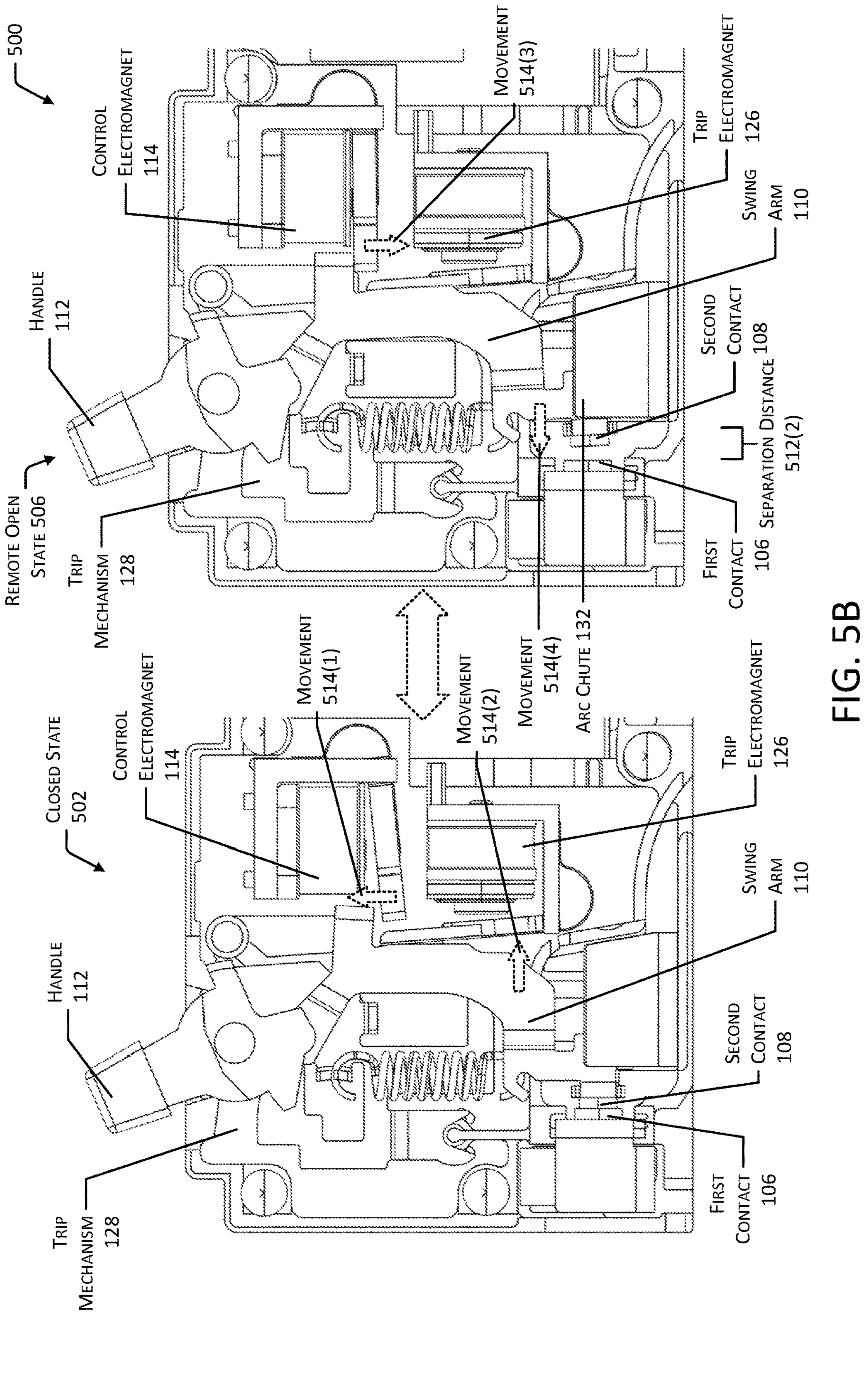
Figure 5C:
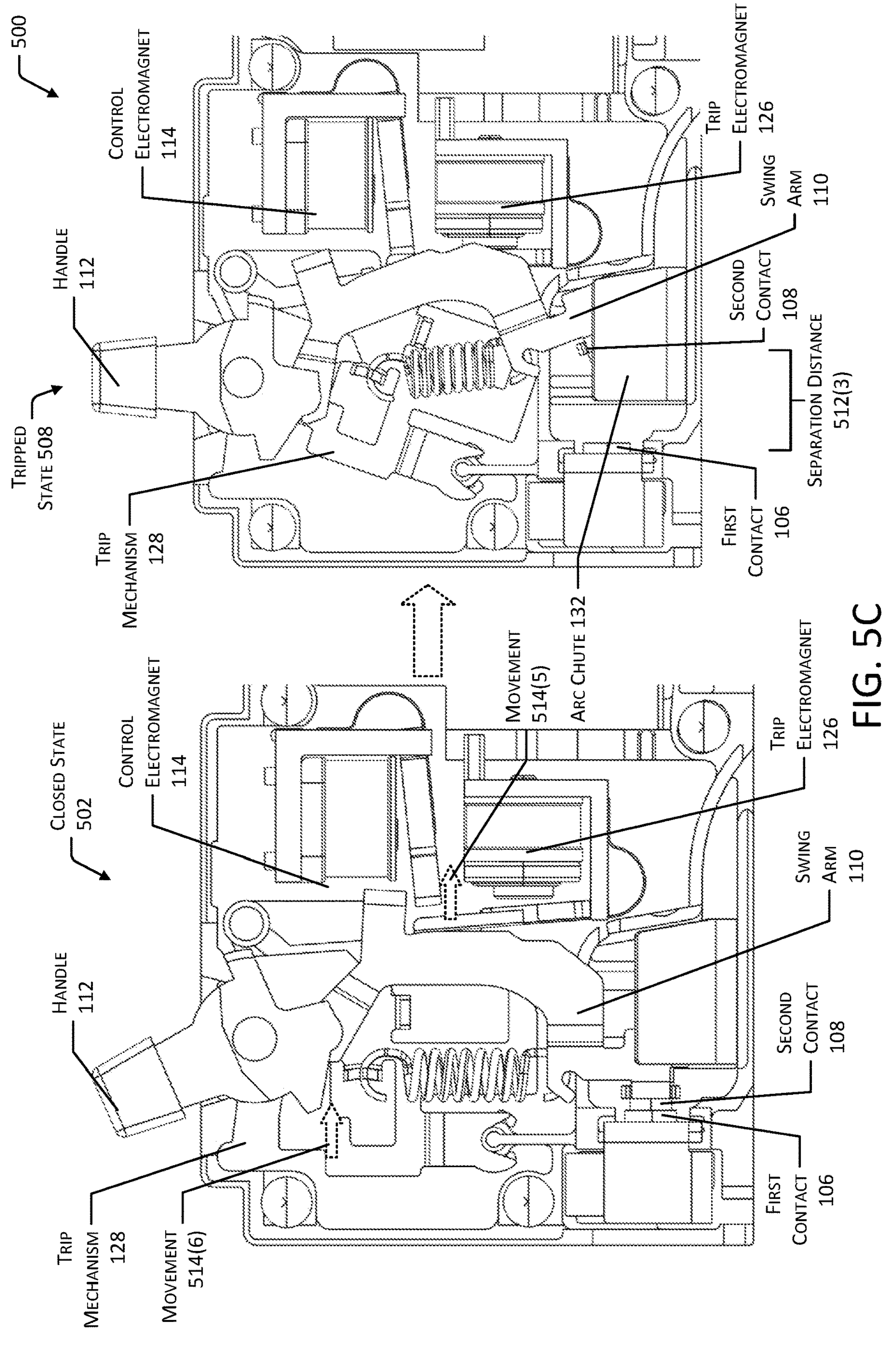

FIGS. 5A-5C are diagrams 500 depicting implementations of the circuit breaker device of FIG. 1 in a closed state 502, a manual open state 504, a remote open state 506, and a tripped state 508. When the circuit breaker device is in the closed state 502, the second contact 108 is in contact with the first contact 106 and electrical power is able to flow through the circuit breaker device to power a load. Neither the control electromagnet 114, the trip electromagnet 126, or the handle 112 is actuated when the circuit breaker device is in the closed state 502, and the swing arm 110 and trip mechanism 128 are in a position that retains the second contact 108 in contact with the first contact 106.

As shown in FIG. 5A, a force 510(1) may be applied to the handle 112 to transition the circuit breaker device from the closed state 502 to the manual open state 504. The handle 112 may be connected to the swing arm 110, such that movement of the handle 112 under application of the force 510(1) also moves the attached swing arm 110, which in turn moves the second contact 108 that is connected to the swing arm 110 away from the first contact 106. When the circuit breaker device is in the manual open state 504, the first contact 106 and second contact 108 are separated by a separation distance 512(1), which prevents the flow of electrical power through the circuit breaker device to the associated load(s). The second contact 108 is also positioned proximate to the arc chute 132 such that any electrical arcs associated with the contacts may be extinguished. To return the circuit breaker device from the manual open state 504 to the closed state 502, a force 510(2) may be applied to the handle 112 in the opposite direction, which may move the handle 112 and attached swing arm 110 to the position shown in the closed state 502 of FIG. 5A, in which the second contact 108 is in contact with the first contact 106.

As shown in FIG. 5B, the circuit breaker device may be transitioned from the closed state 502 to the remote open state 506 by operating the control electromagnet 114 to move the swing arm 110 and attached second contact 108. When the circuit breaker device is in the closed state 502, the armature 204(1) of the control electromagnet 114 may be spaced from the extension 402(1) of the swing arm 110. In other implementations, the armature 204(1) may contact the swing arm 110 but may not apply a force sufficient to move the swing arm 110. When the control electromagnet 114 is actuated to open the main contact switch, movement 514(1) of the armature 204(1) may apply a force to the extension 402(1) of the swing arm 110, which may in turn cause movement 514(2) of the swing arm 110 that separates the second contact 108 from the first contact 106.

When the circuit breaker device is in the remote open state 506, the first contact 106 and second contact 108 are separated by a separation distance 512(2), which in some implementations may be smaller than the separation distance 512(1) associated with the manual open state 504. The second contact 108 may also be positioned proximate to the arc chute 132 to enable electrical arcs associated with the contacts to be extinguished. As described previously with regard to FIGS. 1 and 2, in some implementations, a latching mechanism 208 of the control electromagnet 114 may retain the armature 204(1) in a position that retains the swing arm 110 in the position depicted in the remote open state 506 of FIG. 5B. To return the circuit breaker device from the remote open sate 506 to the closed state 502, the control electromagnet 114 may be operated to move the armature 204(1) away from the electrical coil(s) 202(1) of the control electromagnet 114. Movement 514(3) of the armature 204(1) may enable movement 514(4) of the swing arm 110 that places the second contact 108 in contact with the first contact 106.

As shown in FIG. 5C, the circuit breaker device may be transitioned from the closed state 502 to the tripped state 508 by operating the trip electromagnet 126. As described previously with regard to FIGS. 1 and 3, an armature 204(2) of the trip electromagnet 126 may be connected to the trip mechanism 128 and may retain the trip mechanism 128 in a position that does not apply a force to the swing arm 110 and retains the second contact 108 in contact with the first contact 106. When the trip electromagnet 126 is operated, such as in response to one or more characteristics of electrical power in the circuit breaker device, movement 514(5) of the armature 204(2) of the trip electromagnet 126 may disengage the armature 204(2) from the trip mechanism 128, which may enable movement 514(6) of the trip mechanism 128 in a manner that applies a force to the swing arm 110. The resulting movement of the swing arm 110 may separate the second contact 108 from the first contact 106 and prevent the flow of electrical power across the circuit breaker device.

When the circuit breaker device is in the tripped state 508, the first contact 106 and second contact 108 may be separated by a separation distance 512(3). The separation distance 512(3) associated with the tripped state 508 may be greater than the separation distance 512(1) associated with the manual open state 504 and the separation distance 512(2) associated with the remote open state 506. The second contact 108 may be positioned proximate to the arc chute 132 to extinguish electrical arcs associated with the contacts. To return the circuit breaker device from the tripped state 508, a force 510(1) may be applied to the handle 112 to place the circuit breaker device in the manual open state 504, as shown in FIG. 5A. A second force 510(2) may then be applied to the handle 112 to transition the circuit breaker device from the manual open state 504 to the closed state 502.

Figure 6:
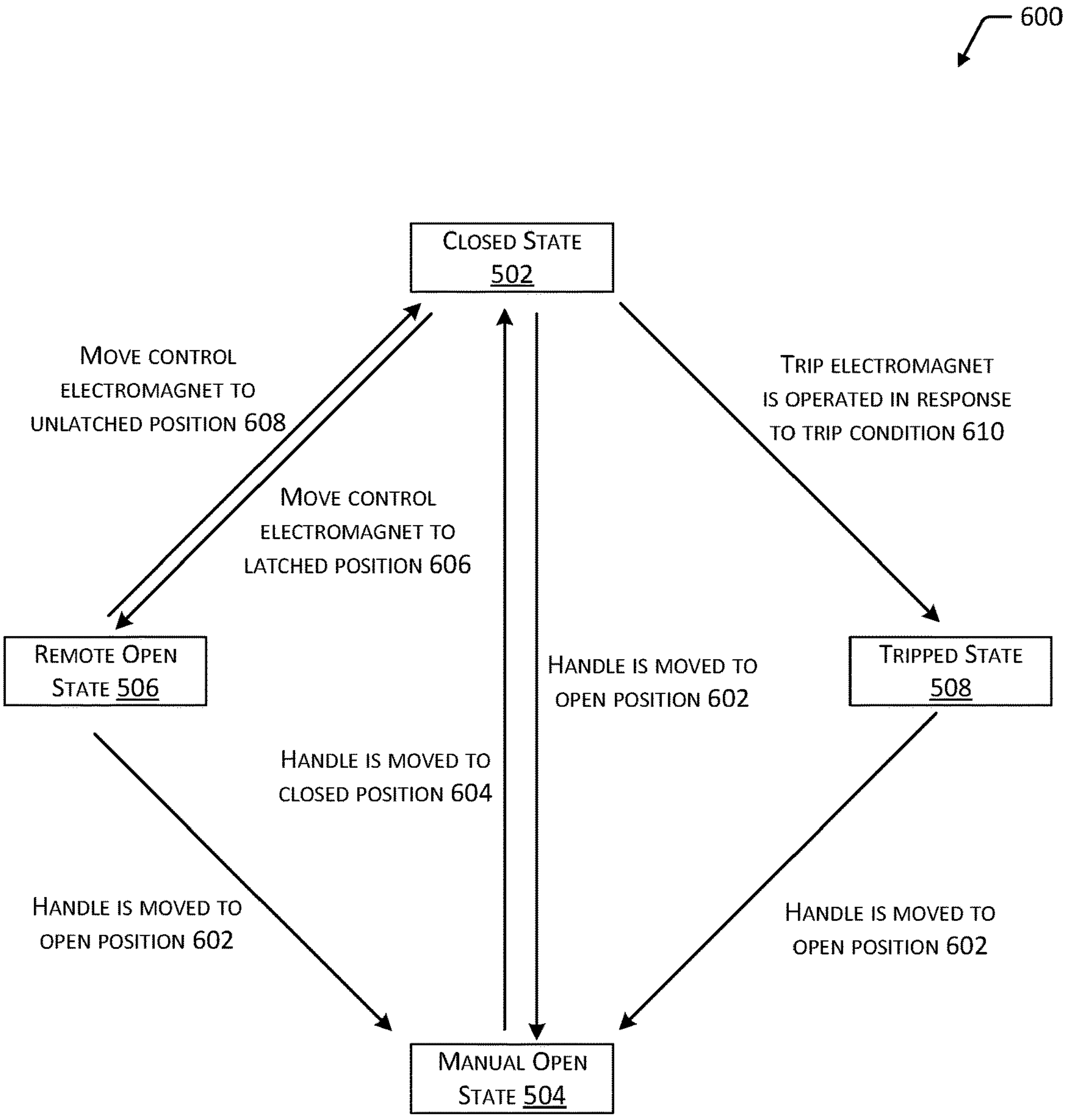
FIG. 6 is a diagram depicting an implementation of the states of the circuit breaker device of FIG. 1 and steps to transition the circuit breaker device between states.

FIG. 6 is a diagram 600 depicting an implementation of the states of the circuit breaker device of FIG. 1 and steps to transition the circuit breaker device between states. As described with regard to FIG. 5, when the circuit breaker device is in the closed state 502, the second contact 108 may be in contact with the first contact 106 and electrical power may flow across the circuit breaker device to energize a load.

If the handle 112 of the circuit breaker device is moved to the open position 602, the circuit breaker device may be transitioned from the closed state 502 to the manual open state 504, which separates the second contact 108 from the first contact 106 by a separation distance 512(1) and prevents the flow of electrical power across the circuit breaker. If the handle 112 of the circuit breaker device is moved to the closed position 604, the circuit breaker device may be transitioned from the manual open state 504 to the closed state 502.

When a command is provided to move the control electromagnet 114 of the circuit breaker device to the latched position 606, the circuit breaker device may be transitioned from the closed state 502 to the remote open state 506, which separates the second contact 108 from the first contact 106 by a separation distance 512(2) and prevents the flow of electrical power across the circuit breaker. If a command is received to operate the control electromagnet 114 to move the control electromagnet 114 to the unlatched position 608, the circuit braker device may be transitioned from the remote open state 506 to the closed state 502. While the circuit breaker device is in the remote open state 506, if the handle 112 is moved to the open position 602, the circuit breaker device may be transitioned to the manual open state 504. Additionally, in some implementations, while the circuit breaker device is in the remote open state 506, the circuit breaker device may not enter the tripped state 508. For example, because current is not transmitted across the main contact switch while the circuit breaker device is in the remote open state 506, faults, overcurrent, and other characteristics of the current that may cause actuation of the trip electromagnet 126 may not occur.

While the device is in the closed state 502, if a trip condition, such as detection of one or more selected characteristics of electrical power associated with the circuit breaker device, occurs, the trip electromagnet 126 of the circuit breaker device is operated in response to the trip condition 610. As described with regard to FIGS. 1 and 3-5, operation of the trip electromagnet 126 may cause movement of the trip mechanism 128, swing arm 110, and second contact 108 of the circuit breaker device, transitioning the circuit breaker device from the closed state 502 to the tripped state 508, which separates the second contact 108 from the first contact 106 by a separation distance 512(3) and prevents the flow of electrical power across the circuit breaker device.

To return the circuit breaker device from the tripped state 508 to the closed state 602, the handle 112 of the circuit breaker device may be moved to the open position 602, which may transition the circuit breaker device from the tripped state 508 to the manual open state 504. Transitioning the circuit breaker device from the tripped state 508 to the manual open state 504 may move the trip mechanism 128 into engagement with the armature 204(2) of the trip electromagnet 126 while maintaining a separation between the second contact 108 and the first contact 106. The handle 112 may then be moved to the closed position 604, which may transition the circuit breaker device from the manual open state 504 to the closed state 502 by moving the swing arm 110 and second contact 108 such that the second contact 108 is in contact with the first contact 106.

Those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:

a communication interface;

a switch comprising:

a first contact connected to a first terminal; and a second contact connected to a second terminal;

one or more sensors that determine a characteristic of a first current between the first terminal and the second terminal;

a first actuator connected to the second contact and configured to move the second contact between:

a closed position in which the second contact is in contact with the first contact; and a first open position in which the second contact is separated from the first contact;

a second actuator connected to the second contact and configured to move the second contact between:

the closed position; and a second open position in which the second contact is separated from the first contact; and control circuitry to cause movement of one or more of the first actuator or the second actuator, wherein:

the control circuitry is configured to actuate the first actuator in response to the characteristic of the first current to cause the second contact to move toward first open position;

in response to a first command received using the communication interface, the control circuitry causes actuation of the second actuator to cause the second contact to move toward the second open position; and in response to a second command received using the communication interface, the control circuitry causes actuation of the second actuator to cause the second contact to move toward the closed position.

2. The device of claim 1, wherein the first actuator comprises a first electromagnet that includes a first coil and a first armature, the device further comprising:

a first mechanical linkage connected to the second contact, wherein the first armature contacts the first mechanical linkage;

wherein actuation of the first electromagnet moves the first armature relative to the first coil to cause movement of the first mechanical linkage, and wherein the movement of the first mechanical linkage causes the second contact to move toward the first open position.

3. The device of claim 2, wherein in response to a second current through the first electromagnet exceeding a threshold value, the first electromagnet is actuated to move the second contact toward the first open position.

4. The device of claim 2, wherein the second actuator comprises a second electromagnet that includes a second coil and a second armature, the device further comprising:

a second mechanical linkage connected to the second contact, wherein the second armature contacts the second mechanical linkage;

wherein the control circuitry further:

in response to one or more of the first command or the second command received using the communication interface, actuate the second electromagnet to move the second armature relative to the second coil to cause movement of the second mechanical linkage, wherein the movement of the second mechanical linkage causes the second contact to move toward the second open position;

wherein the first mechanical linkage is connected to the second mechanical linkage, the first mechanical linkage is connected to the second contact via the second mechanical linkage, and wherein movement of the first mechanical linkage caused by the first electromagnet causes movement of the second mechanical linkage to move the second contact toward the first open position.

5. The device of claim 1, wherein the second actuator comprises an electromagnet that includes a coil and an armature, the device further comprising:

a mechanical linkage connected to the second contact, wherein the armature contacts the mechanical linkage;

wherein in response to the first command received using the communication interface, the control circuitry operates the electromagnet to move the armature in a first direction to a position relative to the coil to cause movement of the mechanical linkage, and wherein the movement of the mechanical linkage causes the second contact to move toward the second open position.

6. The device of claim 5, wherein the electromagnet further comprises:

a latching mechanism that retains the armature in the position relative to the coil in an absence of actuation of the electromagnet;

wherein in response to the second command received using the communication interface, the control circuitry operates the electromagnet to move the armature in a second direction to release the armature from the latching mechanism and cause movement of the mechanical linkage, and wherein the movement of the mechanical linkage causes the second contact to move toward the closed position.

7. The device of claim 1, further comprising:

a first mechanical linkage connected to the second contact and the second actuator, wherein actuation of the second actuator causes movement of the first mechanical linkage to move the second contact between the closed position and the second open position; and a second mechanical linkage connected to the first mechanical linkage and the first actuator, wherein actuation of the first actuator causes movement of the second mechanical linkage to move the first mechanical linkage and move the second contact toward the first open position.

8. The device of claim 1, wherein:

in the first open position, the first contact and the second contact are separated by a first distance;

in the second open position, the first contact and the second contact are separated by a second distance; and the first distance is greater than the second distance.

9. The device of claim 1, wherein:

the first actuator comprises an electromagnet that includes:

a coil;

an armature; and a latching mechanism that retains the armature in a position proximate to the coil in an absence of actuation of the electromagnet;

actuation of the electromagnet in a first direction causes movement of the armature to the position proximate to the coil to cause movement of the second contact toward the second open position; and actuation of the electromagnet in a second direction applies a first force to the armature that is greater than a second force associated with the latching mechanism to remove the armature from the position proximate to the coil and cause movement of the second contact toward the closed position.

10. The device of claim 1, wherein the first actuator comprises a handle that is connected to the second contact via a first mechanical linkage, and wherein the handle is movable to position the second contact in either the closed position or the first open position.

11. A device comprising:

a switch comprising:

a first contact connected to a first terminal; and a second contact connected to a second terminal;

a first actuator connected to the second contact and configured to move the second contact between:

a closed position in which the second contact is in contact with the first contact; and a first open position in which the second contact is separated from the first contact;

a second actuator connected to the second contact and configured to move the second contact between:

the closed position; and a second open position in which the second contact is separated from the first contact;

a first mechanical linkage connected to the second contact and the second actuator, wherein actuation of the second actuator causes movement of the first mechanical linkage to move the second contact between the closed position and the second open position;

a second mechanical linkage connected to the first mechanical linkage and the first actuator, wherein actuation of the first actuator causes movement of the second mechanical linkage to move the first mechanical linkage and move the second contact toward the first open position; and control circuitry to cause movement of one or more of the first actuator or the second actuator.

12. The device of claim 11, further comprising:

one or more sensors that determine a characteristic of current between the first terminal and the second terminal, wherein the control circuitry is configured to actuate the first actuator in response to the characteristic of the current to cause the second contact to move toward first open position.

13. The device of claim 12, wherein the first actuator comprises an electromagnet that includes a coil and an armature, wherein the armature contacts the second mechanical linkage, wherein actuation of the electromagnet moves the armature relative to the coil to cause movement of the second mechanical linkage, and wherein the movement of the second mechanical linkage causes the second contact to move toward the first open position.

14. The device of claim 12, further comprising:

a communication interface, wherein:

in response to a first command received using the communication interface, the control circuitry causes actuation of the second actuator to cause the second contact to move toward the second open position; and in response to a second command received using the communication interface, the control circuitry causes actuation of the second actuator to cause the second contact to move toward the closed position.

15. The device of claim 11, wherein:

the first actuator comprises an electromagnet that includes:

a coil;

an armature; and a latching mechanism that retains the armature in a position proximate to the coil in an absence of actuation of the electromagnet;

actuation of the electromagnet in a first direction causes movement of the armature to the position proximate to the coil to cause movement of the second contact toward the second open position; and actuation of the electromagnet in a second direction applies a first force to the armature that is greater than a second force associated with the latching mechanism to remove the armature from the position proximate to the coil and cause movement of the second contact toward the closed position.

16. The device of claim 11, wherein the first actuator comprises a handle that is connected to the second contact via the first mechanical linkage, and wherein the handle is movable to position the second contact in either the closed position or the first open position.

17. A device comprising:

a switch comprising:

a first contact connected to a first terminal; and a second contact connected to a second terminal;

a first actuator comprising an electromagnet that includes:

a coil;

an armature; and a latching mechanism that retains the armature in a position proximate to the coil in an absence of actuation of the electromagnet;

wherein the first actuator is connected to the second contact and configured to move the second contact between:

a closed position in which the second contact is in contact with the first contact; and a first open position in which the second contact is separated from the first contact;

a second actuator connected to the second contact and configured to move the second contact between:

the closed position; and a second open position in which the second contact is separated from the first contact; and control circuitry to cause movement of one or more of the first actuator or the second actuator;

wherein:

actuation of the electromagnet in a first direction causes movement of the armature to the position proximate to the coil to cause movement of the second contact toward the second open position; and actuation of the electromagnet in a second direction applies a first force to the armature that is greater than a second force associated with the latching mechanism to remove the armature from the position proximate to the coil and cause movement of the second contact toward the closed position.

18. The device of claim 17 further comprising:

a first mechanical linkage connected to the second contact and the second actuator, wherein actuation of the second actuator causes movement of the first mechanical linkage to move the second contact between the closed position and the second open position; and a second mechanical linkage connected to the first mechanical linkage and the first actuator, wherein actuation of the first actuator causes movement of the second mechanical linkage to move the first mechanical linkage and move the second contact toward the first open position.

19. The device of claim 17, further comprising:

one or more sensors that determine a characteristic of current between the first terminal and the second terminal, wherein the control circuitry is configured to actuate the first actuator in response to the characteristic of the current to cause the second contact to move toward the first open position.

20. The device of claim 19, further comprising:

a communication interface, wherein:

in response to a first command received using the communication interface, the control circuitry causes actuation of the second actuator to cause the second contact to move toward the second open position; and in response to a second command received using the communication interface, the control circuitry causes actuation of the second actuator to cause the second contact to move toward the closed position.

* * * * *